UNITED STATES PATENT OFFICE.

EMIL WIESE, OF HAMBURG, GERMANY.

PROCESS OF MAKING AN ADHESIVE.

1,168,137.  Specification of Letters Patent.  Patented Jan. 11, 1916.

No Drawing.  Application filed August 7, 1915. Serial No. 44,307.

*To all whom it may concern:*

Be it known that I, EMIL WIESE, a citizen of Hamburg, German Empire, residing at Hamburg, Germany, have invented certain new and useful Improvements in Processes of Making an Adhesive, of which the following is a specification.

It has already been proposed to manufacture compound glass by uniting glass plates by means of gelatin that has been softened on its surface by suitable solvents. The softening of the surface of the gelatin imparts to the latter an irregular consistency or structure which cannot be removed or equalized by subsequent heating under higher or lower pressure, so that the resulting compound glass is not perfectly transparent.

The gelatin solution constituting an adhesive which may be employed for the above purpose is produced by causing hydrogen peroxid, acetic acid and zinc chlorid to act upon gelatin. As an example, to 1 liter of 3 per cent. hydrogen peroxid there are added 100 cubic centimeters of pure acetic acid, and in this mixture there are dissolved 180 grams of zinc chlorid. In the resulting liquid there are dissolved 600 grams of gelatin with moderate heat. This solution is left to stand for four to five days, after which it is filtered. The clear colorless solution of gelatin thus obtained is particularly adapted for the preparation of microscopic and natural history specimens, as well as making compound glass.

I claim:

1. A process of making an adhesive which comprises acting upon gelatin with a warm mixture of hydrogen peroxid, acetic acid and zinc chlorid, then allowing the product to stand for several days and filtering the same.

2. A process of making a liquid adhesive which comprises digesting 600 grams of gelatin with a warm mixture of 1 liter of 3% hydrogen peroxid, 100 cubic centimeters of acetic acid, 80 grams of zinc chlorid, allowing the mixture to stand for several days and filtering the same.

In testimony whereof I affix my signature.

EMIL WIESE.

Witnesses:
 FRANCIS R. STEWART,
 CHAS. A. HEYER.